No. 798,057. PATENTED AUG. 22, 1905.
C. NIELSEN.
VALVE FOR PNEUMATIC TIRES, &c.
APPLICATION FILED APR. 26, 1905.
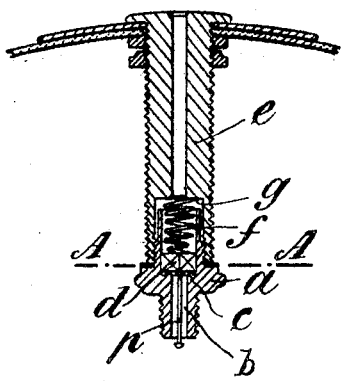
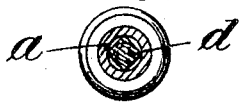
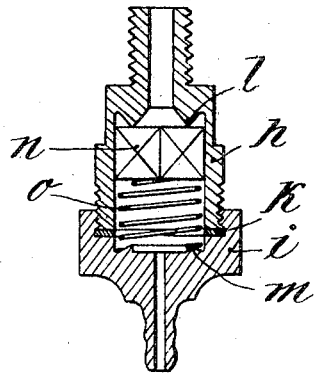
Witnesses
Inventor
Carl Nielsen
by H. B. Willson
Attorney

UNITED STATES PATENT OFFICE.

CARL NIELSEN, OF COPENHAGEN, DENMARK.

VALVE FOR PNEUMATIC TIRES, &c.

No. 798,057.          Specification of Letters Patent.          Patented Aug. 22, 1905.

Application filed April 26, 1905. Serial No. 257,549.

*To all whom it may concern:*

Be it known that I, CARL NIELSEN, manufacturer, residing at Copenhagen, in the Kingdom of Denmark, have invented new and useful Improvements in Valves for Pneumatic Tires, Pumps, and the Like, of which the following is a specification.

The present invention refers to a valve for pneumatic tires, pumps, &c., in which the valve proper or part effecting the cut-off is made of an elastic oil-proof material.

It is an essential feature of this invention that an elastic polygonal valve is arranged within a cylindrical valve-case in such a manner that its edges are in contact with the inside of the case. Hereby it is obtained that the valve proper or part effecting the cut-off is not only pressed by the force in the pneumatic tire against the valve-seat, but also its edges are pressed against the inner sides of the valve-case, for owing to the fact that the valve proper is made of an elastic material it will while being forced against the valve-seat also be compressed to a slight extent in the direction of the pressure and expand accordingly in a transverse direction. Thus by the edges of the valve being pressed against the inner sides of the valve-body the valve itself is secured in its closing position. This is of importance where the chambers communicating with the valve-tube, as pneumatic tires, are in constant motion.

With these and other objects in view the invention consists of certain novel features of construction, combination, and arrangement of parts, as will be hereinafter described and claimed.

In the accompanying drawings valves of the above kind are shown in two different modifications.

Figure 1 is a longitudinal section through a valve of this type for a pneumatic tire. Fig. 2 is a section through the same valve, taken on the plane indicated by the line A A of Fig. 1. Fig. 3 is a double-seat valve which is particularly suited for motor-cars and for sucking-pumps, shown in sectional view.

The valve case or body $a$, in the lower part of which is arranged the channel $b$, through which the current of air enters, has a conical seat $c$. On this seat $c$ the valve proper, $d$, rests while the valve is closed. This part $d$ is made of a light oil-proof elastic material like caoutchouc. In the present example it is made of rectangular cross-section, but can be of any other polygonal shape. The upper tube or cover $e$ of the valve has a chamber-like enlargement at its lower end and is connected with the valve-body $a$ in any desirable manner. In the example of Fig. 1 the cover is screwed over the valve-body. Between the wall $g$ of the tube $e$ and the valve proper, $d$, a spiral spring is arranged, keeping the valve forced against the seat $c$ when the valve is not operated.

As will be clearly seen from Fig. 2, the polygonal valve $d$ touches with its edges the cylindrical inner sides of the valve-case $a$. If there be now within the chamber (pneumatic tire or the like) a higher pressure, the part $d$ is not only forced against the valve-seat $c$, but is also compressed in one direction and correspondingly expands in the other, whereby it presses with its edges against the walls of the case. If, however, a current of air enters the valve-body through the entrance-channel $b$, the valve $d$ is lifted from its seat $c$, returning at the same time into its original form. With the part $d$ a pin $p$ can be connected, passing through the valve $d$ and the channel $b$ and provided with a button outside said channel. This allows of lifting the valve $d$ from outside from its seat $c$, so as to allow of the air escaping from the pneumatic tire. The spring $f$ may be attached to the upper end of the pin $p$. Owing to the polygonal shape of the part $d$, a space is left free between this part and the walls of the casing $a$, affording a passage for the air forced in. By suitable choice of the form of the part $d$ this space can be so dimensioned that its area is exactly equal to the inside area of the entrance-channel $b$. Thus the air in the valve-body will not be choked or caused to whirl and a smooth working of the valve is insured.

In Fig. 3 is shown a longitudinal section through a valve with two seats. The valve-case is made of the two parts $h$ and $i$, which are screwed together, a jointing-washer $k$ being inserted between. The part $h$ is provided with the conical valve-seat $l$ and part $i$ with a conical valve-seat $m$. The valve $n$, made of polygonal shape and of an elastic oil-proof material, can be placed on either the seat $l$ or the seat $m$, the spring $o$ being arranged accordingly. Hereby it is rendered possible to employ the valve, which is very desirable for use on motor-car pneumatic tires and for various other purposes.

Having thus described the nature of this my invention, I declare that what I claim, and desire to secure by United States Letters Patent, is—

The herein-described valve, consisting of a casing having a cylindrical bore therein and provided with a conical valve-seat, an oil-proof elastic compressible valve in said casing, said valve comprising a polygonal block of rubber of such size that when uncompressed the edges produced by its polygonal conformation will be in contact with the cylindrical bore, and a spring bearing against said valve for holding it to its seat, substantially as described.

In witness whereof I subscribe my signature in presence of two witnesses.

CARL NIELSEN.

Witnesses:
HENRY HASPER,
WOLDEMAR HAUPT.